United States Patent [19]
Ackley

[11] 3,984,908
[45] Oct. 12, 1976

[54] STATOR TERMINAL ASSEMBLY MACHINE

[75] Inventor: George Nelson Ackley, Hershey, Pa.

[73] Assignee: Amp, Incorporated, Harrisburg, Pa.

[22] Filed: Oct. 1, 1975

[21] Appl. No.: 618,649

[52] U.S. Cl. .......................... 29/205 D; 29/203 DS; 29/596; 29/628; 310/71
[51] Int. Cl.² ........................................ H02K 15/00
[58] Field of Search ....... 29/205 R, 205 D, 203 DT, 29/203 D, 203 DS, 203 P, 596, 628; 310/71; 339/97 R, 97 P, 98, 99 R

[56] References Cited
UNITED STATES PATENTS

| | | | |
|---|---|---|---|
| 2,443,457 | 6/1948 | Herman | 29/596 UX |
| 3,562,904 | 2/1971 | Lau et al. | 29/628 |
| 3,813,763 | 6/1974 | Church | 29/596 |
| 3,861,026 | 1/1975 | Swaim | 29/596 |
| 3,867,658 | 2/1975 | Dochterman | 310/71 |
| R26,208 | 5/1967 | Tupper | 29/596 UX |

*Primary Examiner*—C.W. Lanham
*Assistant Examiner*—James R. Duzan

[57] ABSTRACT

An apparatus for attaching slotted plate terminals or the like to individual wires such as the wires of a stator coil in an induction motor is disclosed. A rotatable arbor positions the stator in alignment with an insertion track and ram. A terminal is inserted by moving it along the tracks and into a cavity in an insulating housing mounted on the stator. A guide track along which an insertion ram moves a terminal also acts as a depth control for accurate positioning of the terminal.

18 Claims, 13 Drawing Figures

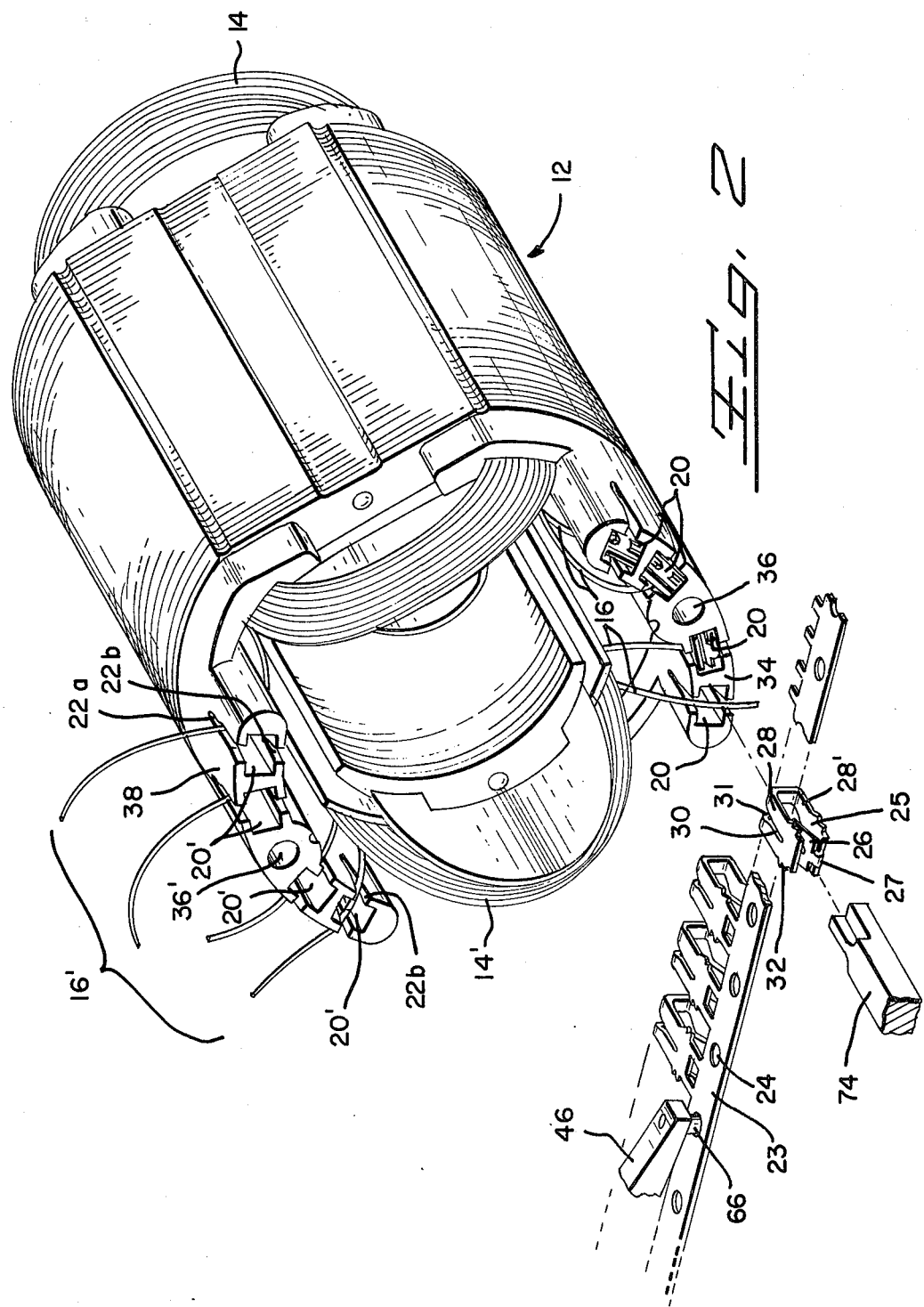

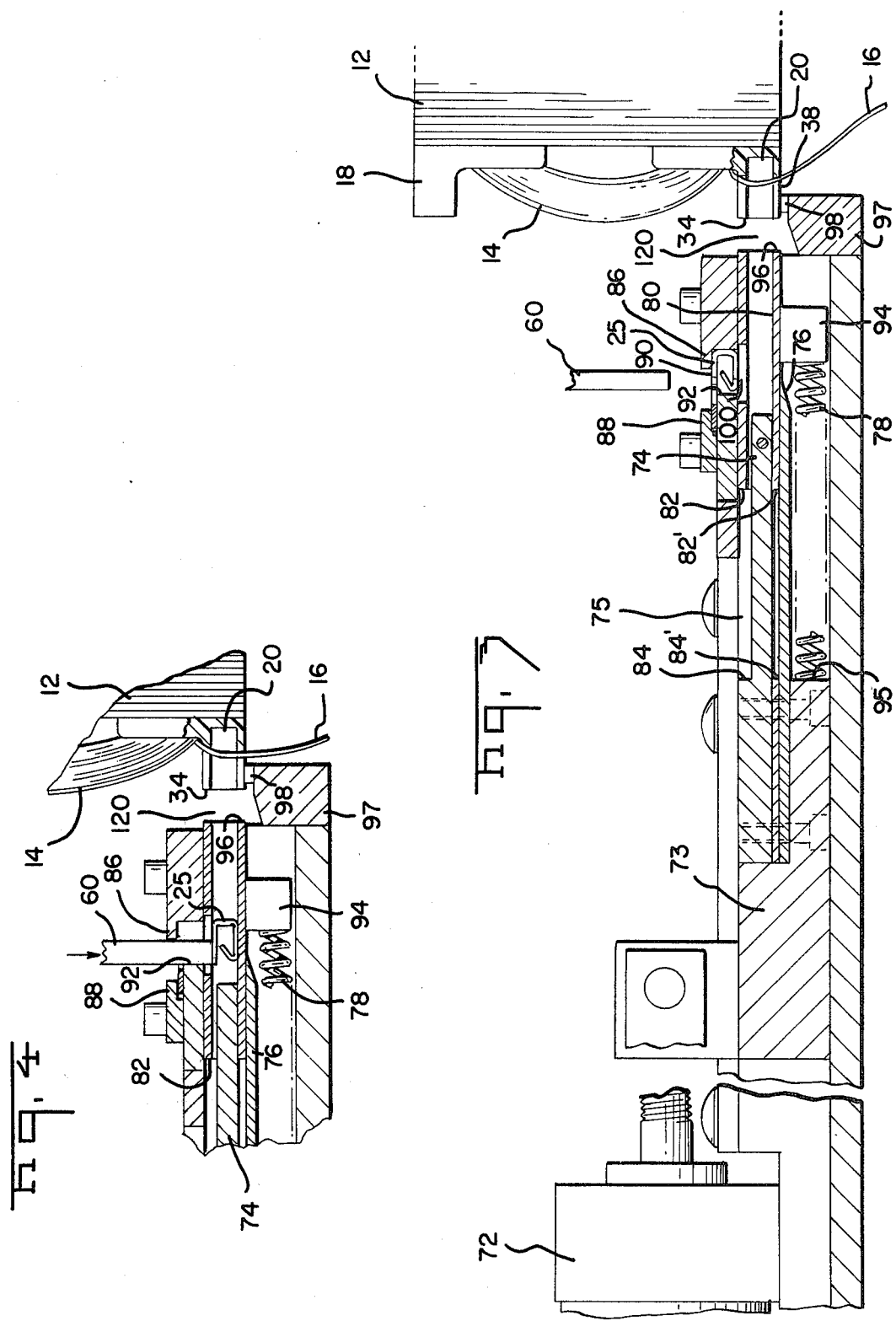

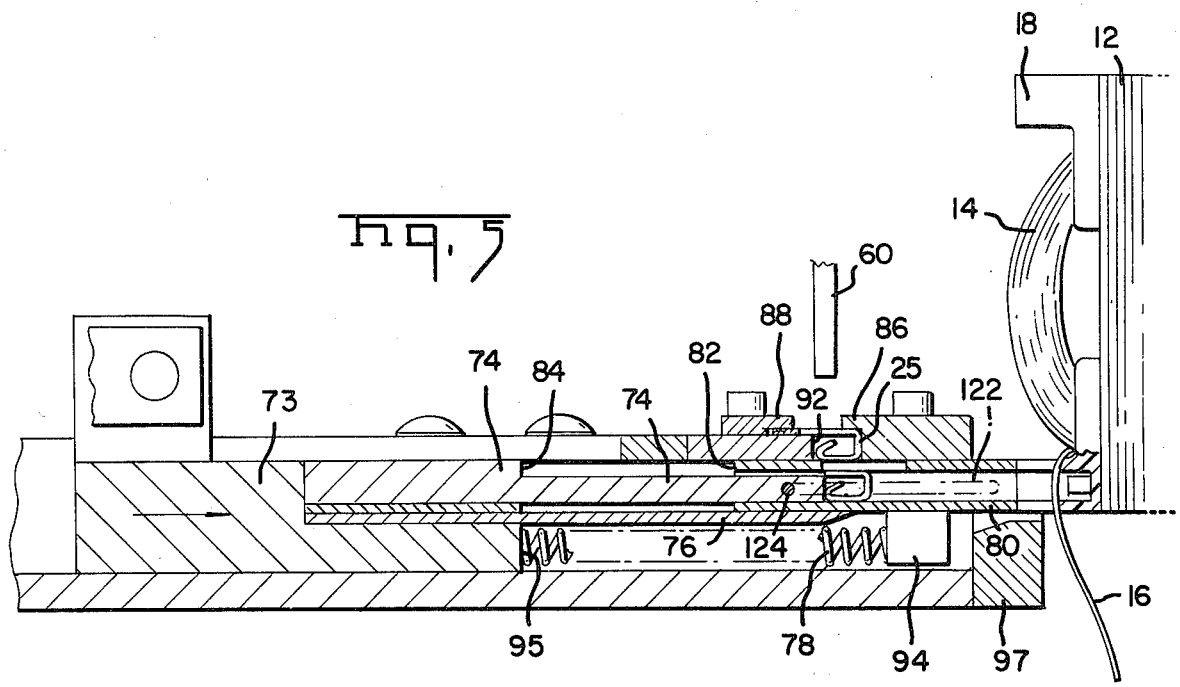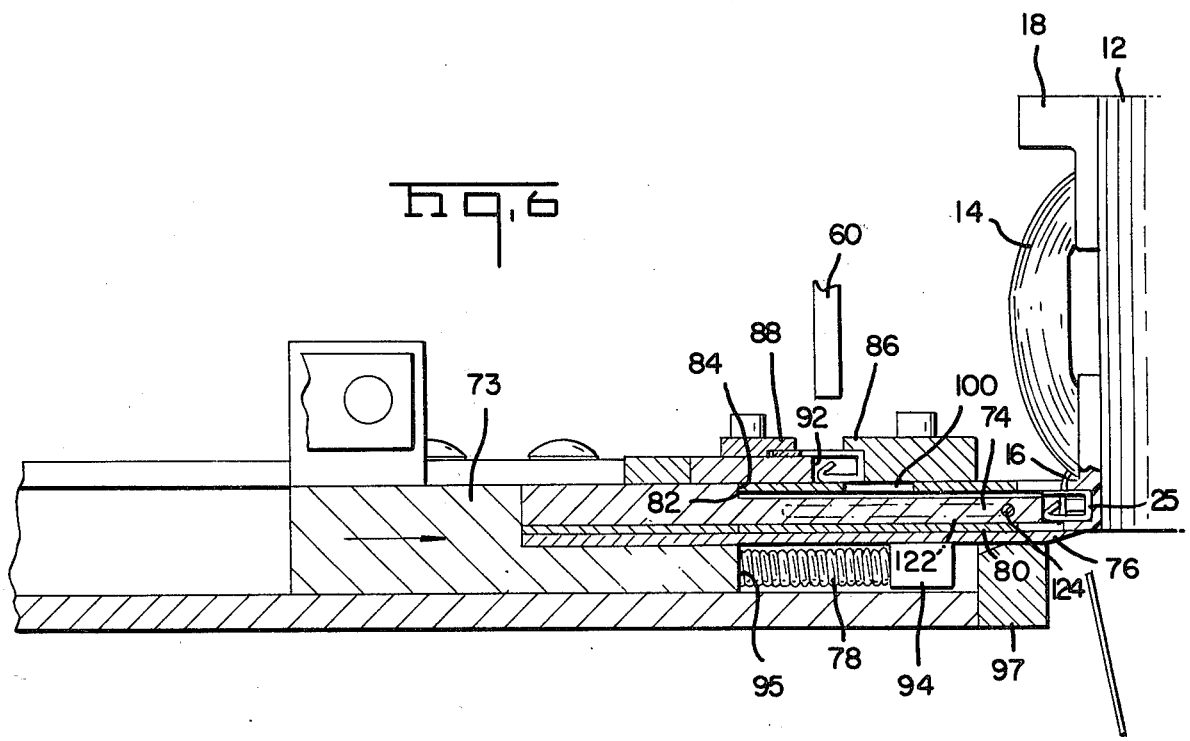

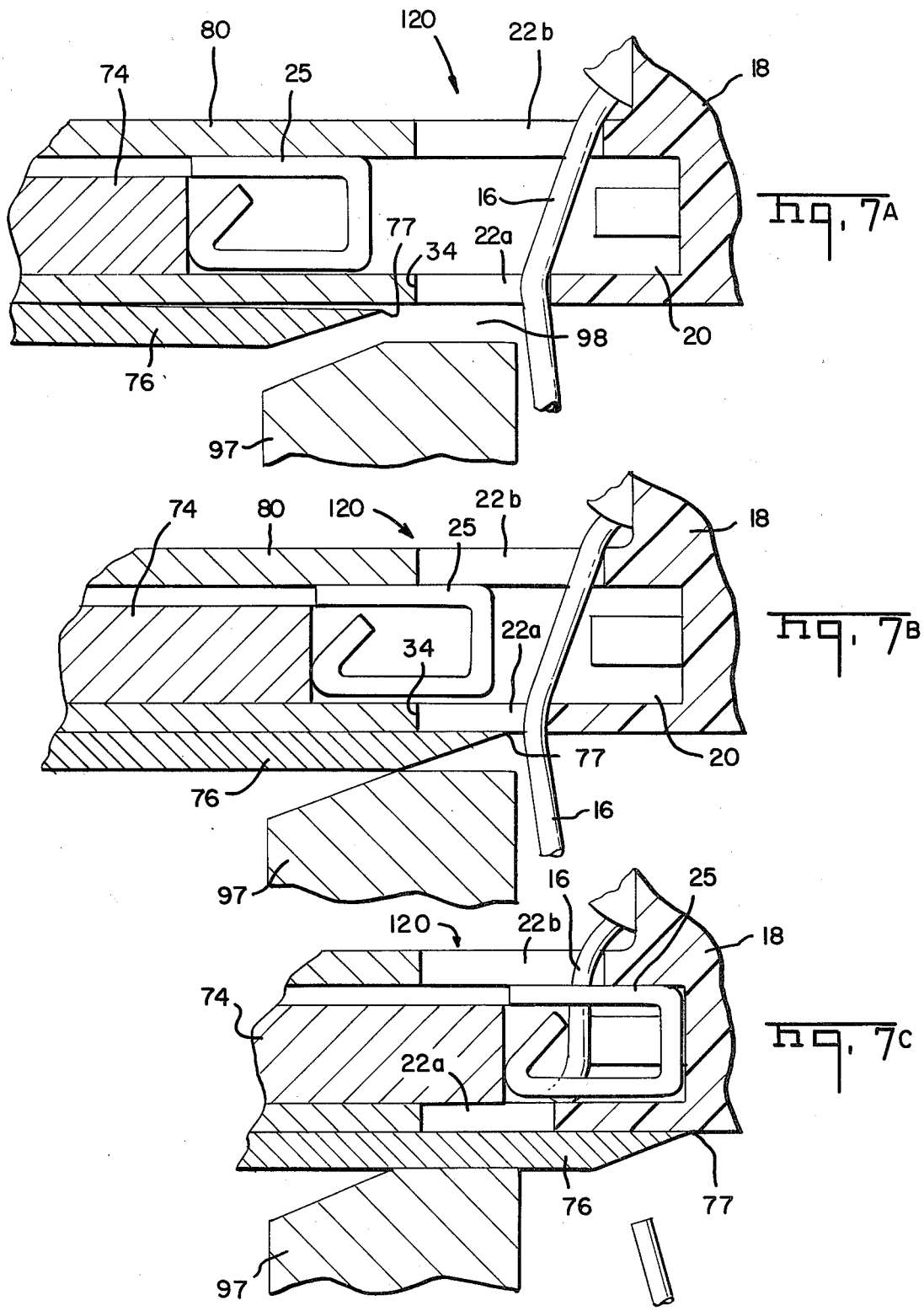

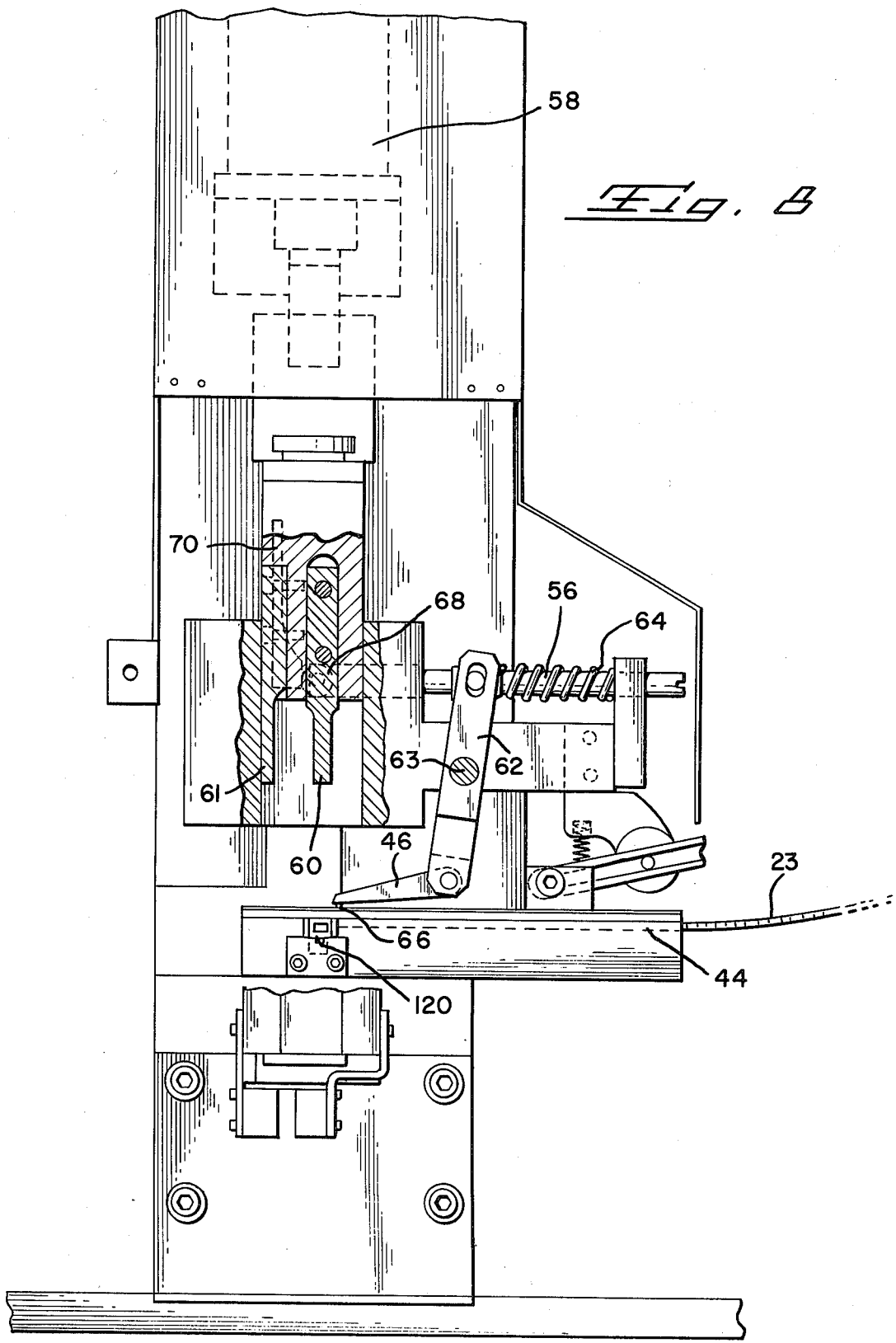

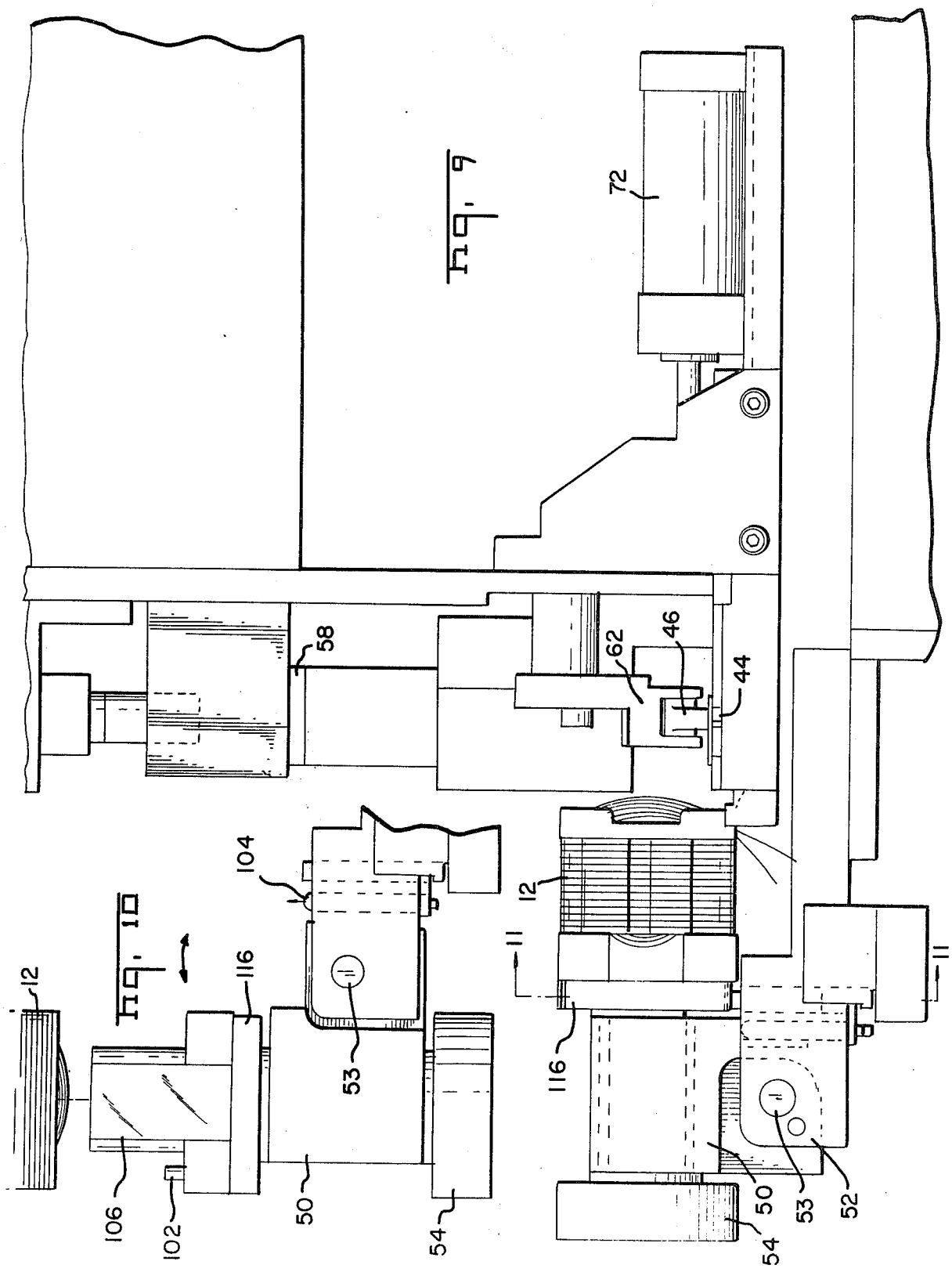

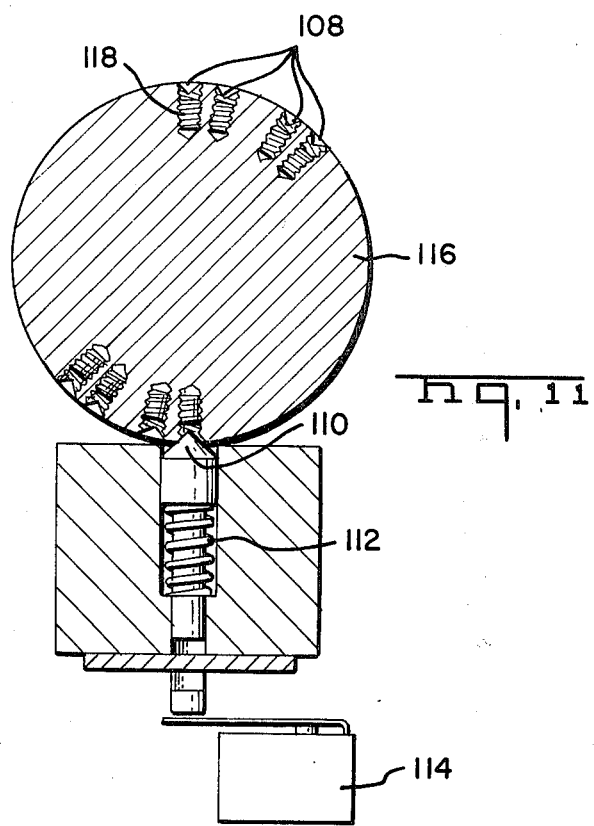

STATOR TERMINAL ASSEMBLY MACHINE

BACKGROUND OF THE INVENTION

Field of the Invention

This invention relates to the termination of electrical wires used in induction coils. Termination is accomplished by using a slotted contact terminal. The use of such a solderless termination technique leads to more rapid termination of coil wires when used with applicator apparatus of the type disclosed herein.

SUMMARY OF THE INVENTION

An apparatus for inserting contact terminals into appropriate cavities in an insulating housing is used in conjunction with a mounting means which has indexing means for positioning the cavities. Wires are laced across the cavities so that when the terminal is inserted into the cavities, electrical contact is established with the wire. This apparatus and method can be used in a number of different situations, but it is especially useful when used to terminate magnet wires in a coil of a stator of an induction motor. The present embodiment is adapted for just such a use, but the invention is equally applicable to the termination of wires of a different character when used with various other devices.

In this embodiment, the cavities are located about the circumference of the cylindrical stator and a rotatable arbor is used for mounting the stator and indexing the cavities. Terminals are strip fed and delivered to an insertion track which guides an insertion arm. The insertion track acts not only as a guide for the insertion ram but also acts as a depth control means which assures proper insertion of the terminal into the cavity and of the wire into the terminal.

Accordingly, the objects of this invention include provision of an apparatus and method for termination of wires by moving the terminals into a housing cavity. Another object is to provide means for accurately positioning the wire in the conductor receiving means of the terminal. One other object is to provide a mounting and indexing means for sequentially aligning the individual terminal cavities with a single insertion ram. Still another object is to provide an insertion mechanism which is readily adaptable for use with insulating housings having a wide variety of cavity spacing and configurations. Also, the insertion mechansim is readily adaptable to multiple insertion rather than the single insertion embodiment herein disclosed. These and other objects are accomplished by the disclosed embodiment as well as for numerous other embodiments which are within the scope of this invention and differing only in certain nonessential details.

BRIEF DESCRIPTION OF THE DRAWINGS

FIG. 2 shows a stator for an induction motor with a terminal housing attached on one end and a carrier strip of individual terminals.

FIG. 3 is a sectional side view of the insertion mechanism showing the initial or retracted position of the insertion ram.

FIG. 4 shows the terminal punch as it severs a single terminal from the carrier strip.

FIG. 5 shows the initial portion of the insertion stroke.

FIG. 6 shows the completion of the insertion stroke with the ram in its extended position.

FIGS. 7A, 7B, and 7C show the details of the termination of a wire.

FIG. 8 is a front view showing details of the terminal punch and the terminal feed mechanism.

FIG. 9 is a side view of the machine showing the stator mounted on a hinged arbor which has been rotated into position for terminal insertion.

FIG. 10 is a hinged arbor in its open position.

FIG. 11 is a sectional view of the arbor showing a terminal indexing mechanism.

DETAILED DESCRIPTION OF THE DRAWINGS

Figure 1:
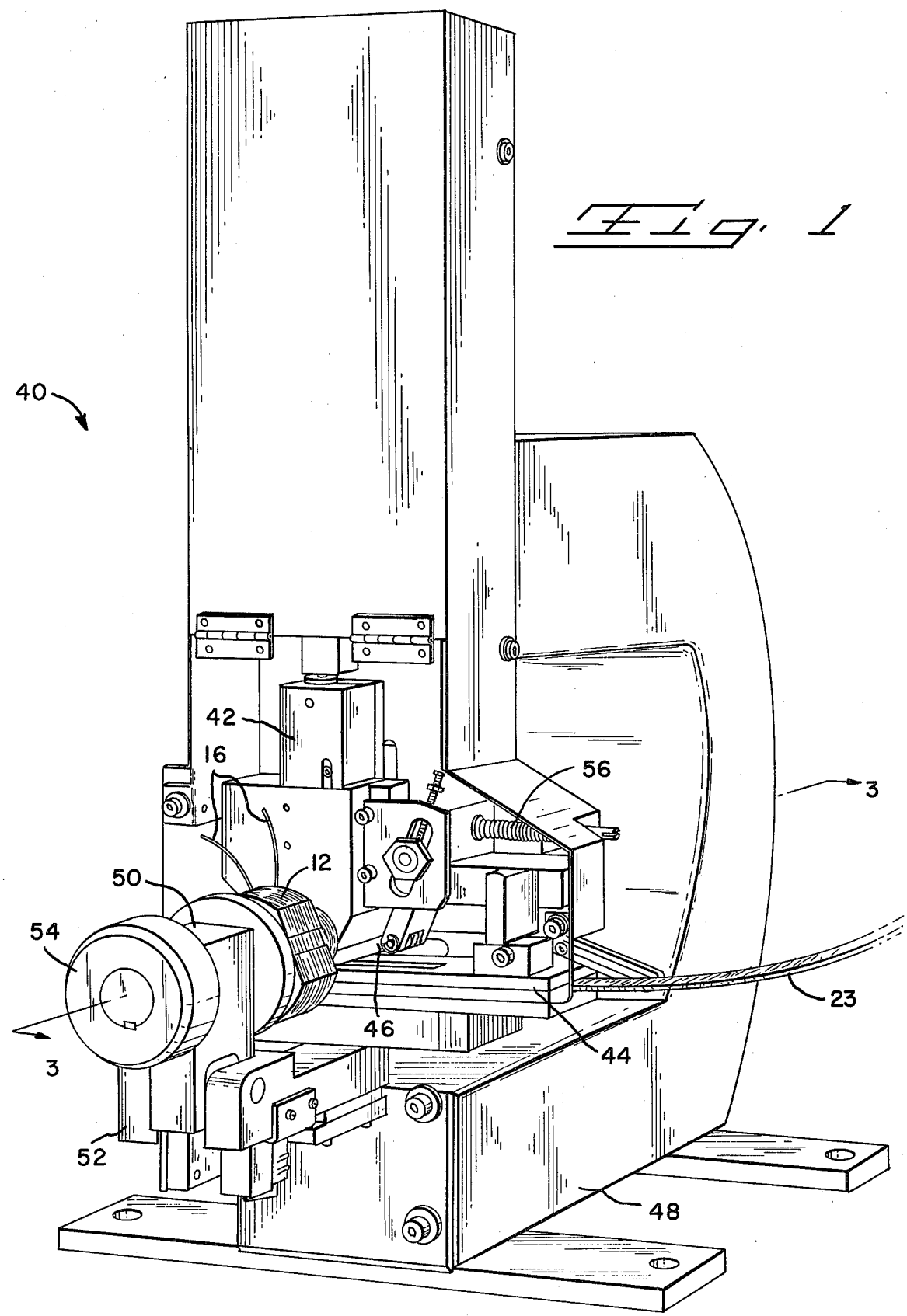
FIG. 1 is a perspective view of the terminal assembly machine.

FIG. 1 is a perspective view showing the staor terminal assembly machine 40. A stator 12 has been mounted on arbor 50 and is in position for insertion of individual terminals. An upright punch 42 is shown immediately above stator 12. This punch moves vertically to sever individual terminals from a carrier strip 23 which is shown entering the machine from the right. This carrier strip travels along a terminal feed track 44 to a position immediately opposite stator 12. Terminal feed arm 46 acts to move the terminal strip to the left so that individual terminals are fed into the vicinity of a loading station.

FIG. 2 illustrates details of the stator 12, plastic terminal housing 18 and slotted terminals 25. Plastic terminal housing 18 has been mounted on one end of the stator 12. The coils 14 and 14 are wrapped around portions of the terminal housing securing them to the stator. The terminal housing 18 has four terminal cavities 20, 20 located on its opposite sides. These cavities are located on the periphery of stator 12. A circular hole 36, 36 is located in the center of each terminal cavity housing portion. The individual terminal cavities 20 and 20 are rectangular, but they could be circular or, in fact, any desirable shape which conforms to an appropriate terminal. Each cavity has a slot 22 in two opposite sidewalls, one along the outer wall of the stator and one along the inner wall of the stator. Separate coil wire ends 16 and 16 have been laced into slots 22 in each cavity and captured therein so that the wire spans the cavity.

Terminal carrier strip 23 is positioned along the front of stator 12. Carrier strip 23 has a number of individual terminals 25 extending from one side of the carrier strip and also has a number or circular holes 24 along its length. Terminal feed arm 46 and terminal feed finger 66 are shown mated with one of advance holes 24. One terminal 25 is shown severed from carrier strip 24. This terminal has opposite sidewalls 28 and 28 with aligned slots 30, 30 which serve as conductor receiving means in each sidewall. Wire-receiving end 31 is located adjacent to one terminal cavity 20 and can be termed the leading end. Terminal 25 has a deflected tab 26 extending from the rear of one sidewall 28 . Tab 26 is connected to sidewall 28 by curved strip 27. Tab 26 is intended for use in conjunction with an external wire, not shown. Each coil wire is to be connected with such an external wire. This tab is only illustrative of a number of different structures which could be used to contact one or more external wires or a separate terminal to which such wires may be attached. Each terminal has a number of lances 32 located on the edge of each sidewall. When each terminal is inserted into a cavity 20, these lanches serve to anchor the terminal in the cavity by digging into its plastic walls.

Insertion ram 74 is shown in alignment with this single terminal and with one terminal cavity. This figure shows that three terminals have already been inserted into appropriate terminal cavities.

FIG. 9 is a sideview of a stator 12 shown mounted on arbor 50. FIG. 10 shows arbor 50 in its mounting positon with a stator aligned with the arbor.

Arbor 50 rotates about its axis 50 as well as about pivot 53. A circular knob 54 is located at one end of arbor 50. The arbor is hinged about point 53 between knob 54 and cylindrical mounting portion 106. In the position of FIG. 10 a stator can be easily mounted on arbor 50. When the arbor is rotated into the position of FIG. 9, the control knob 54 is readily accessible to an operator who need not be exposed to the insertion mechanism. The cylindrical portion 106 is located on the top of arbor 50. Cylindrical portion 106 has a diameter substantially equal to the inside diameter of the stator. Stator 12 is positioned around cylinder 106 with circular hole 35 on the stator positioned on pin 102 which is located on the arbor. Arbor 50 can be rotated about pivot 53 from its upright mounting position shown in FIG. 10 to the position shown in FIG. 9. A limit switch is activated when the arbor comes into contact with trip 104. Actiivation of this switch occurs only when the arbor and stator are in the working position shown in FIG. 9. In this position, an individual cavity 20 would be aligned with an insertion mechanism powered by piston 72.

In this embodiment, each terminal cavity is sequentially aligned with the insertion mechanism by rotating knob 54 on the rear of arbor 50. Rotation of this knob indexes the stator to the next terminal position. FIG. 11 is a sectional view showing the indexing mechanism utilized. The core 116 of the arbor has a number of indexing detents 108 aligned with respective terminal cavities 20 and 20'. A detent button 110 is located below the arbor and when this detent button locates an appropriate detent 108, the action of spring 112 results in the activation of limit switch 114. Activation of indexing limit switch 114 and arbor positioning switch 104 are both necessary for proper activation of the insertion and punch mechanism. Each detent 108 has a set screw 118 mounted therein. These set screws can be utilized to seal any particular detent by setting the screw flush with the surface of the arbor. In this way, the assembly mechanism cannot be activated for a given terminal position.

The insertion mechanism is not shown in FIG. 9 but operates along a horizontal path between stator 12 and piston 72. In FIG. 9, the terminal feed track 44 is shown from one end. Terminals are fed along track 44 to a position between stator 12 and the insertion mechanism. Terminal feed arm 46 and feed lever 66 are located immediately above the track 44. An upright terminal punch mechanism operated by piston 58 is also shown in this figure. This punch mechanism is located in alignment with a terminal feed station 90 and is perpendicular to the insertion mechanism.

FIG. 8 is a front view of the terminal punch mechanism used to separate an individual terminal from carrier strip 23. Carrier strip 23 shown on the right of the Figure extends along track 44 to terminal loading station 90 located below the punch mechanism. Piston 58 drives insertion punch 60 down so that each terminal can be separated from strip 23. FIGS. 3 and 4 show this separation. Cover plates 86 and 88 extend along track 44 and beside suitable guides for the carrier strip. On its downward travel, punch 60 strikes an individual terminal 25 severing it from the carrier strip in conjunction with shoulder 92. This forces terminal 25 down into insertion track 80. A second movable punch 61 is located beside punch 60 and moves with punch 60. This punch acts to remove scrap from the ends of the carrier strip.

FIG. 8 also shows the terminal feed mechanism which is actuated by movement of the vertical punch mechanism. A horizontal bar 56 serves as the terminal feed actuator. This actuator is biased to the left in FIG. 8 by the action of spring 64. A cam follower 68 is attached to the left end of the terminal actuator. Terminal feed cam 70 is attached to severing punch 60 so that it undergoes similar vertical translation. The cam follower moves along this terminal feed cam. In FIG. 8, the terminal feed actuator is shown at its maximum rightward deflection. A lever 62 is attached to actuator 56 and is pivoted about point 63. Terminal feed arm 46 is attached to the lower end of lever 62 so that upon full rightward deflection of actuator 56, arm 46 attains its maximum leftward translation. Feed finger 66 comprises a pin located on the left end of feed arm 46. This pin can be mated with individual advanced holes on the carrier strip as shown in FIG. 2. Upon downward travel of terminal punch 60, cam 70 causes actuator 56 to move to the left and consequently feed arm 46 moves to the right. Feed finger 66 has an inclined surface, not shown, which allows appropriate disengagement of the advance hole 24 upon movement of the actuating arm to the right in FIG. 8. In this way, an individual terminal is advanced to terminal feed station 90 and severed from the carrier strip in a single cycle of punch 60.

FIGS. 3–7 show the insertion mechanism and its operation. The insertion mechanism comprises actuating means, such as piston 72, which drives a ram base 73 to the right as viewed in FIG. 3. Terminal insertion ram 74 is located on the right side of ram base 73 and is attached to the ram base at the rearward edge of the ram. Ram 74 comprises a relatively long rod located in a cavity 75. This cavity is aligned with a terminal cavity 20 best shown in FIG. 3. FIG. 3 shows loading station 120 located in the vicinity of the right end of insertion cavity 75 and the left end of terminal cavity 20. An insertion tube or track 80 is located in the right portion of cavity 75 adjacent to the terminal cavity 20. Tube 80 has an opening 100 along its upper surface which is located in alignment with terminal punch 60 at terminal feed station 90. As shown in FIG. 4, this allows punch 60 to sever an individual terminal 25 and push it down through opening 100 and into tube 80. The leading edge of insertion ram 74 is within tube 80 in the position illustrated in FIG. 3.

In FIG. 3, the left shoulder or rearward end 82 of tube 80 is spaced a considerable distance from face 84 located on ram base 73. Tube 80 is attached to one end of spring 78. The other end of spring 78 is attached to shoulder 95 on ram base 73. This is the only connection betweeen ram base 73 and tube 80. A cutter bar 76 is located below a portion of tube 80 as shown in FIG. 3. FIG. 8 shows that cutter bar 76 is positioned beside stop 94 and spring 78. A block 97 is attached to the righthand side of the insertion mechanism and is located below terminal cavity 20. The upper surface block 97 is inclined to form an opening 98 for the passage of cutter blade 76.

FIGS. 3–6 show one complete cycle of the terminal severing mechanism and the terminal insertion mechanism. FIG. 3 shows a terminal 25 still on the carrier strip and positioned above tube passage 100 at terminal feed station 90. Severing punch 60 and insertion ram 74 are both shown retracted in FIG. 3. The initial step is shown in FIG. 4 as punch 60 moves pash shoulder 92 to sever terminal 25 from the carrier strip and force it down into tube 80. Tube 80 is spaced from cavity 20 to allow room for positioning individual cavities in proper position. Terminal 25 is now aligned with terminal cavity 20. Ram base 73 now moves to the right as shown in FIG. 5. Spring 78 exerts a force to the right driving tube 80 in that direction until tube 80 abuts the outer face of terminal cavity 20 at loading station 120. This face thereafter serves as a reference surface. Tube 80 is now aligned with the entrance of cavity 20 forming a continuous passage for terminal 25. As ram base 73 moves to the right, ram 74 and cutter blade 76, both rigidly attached to the ram base 73, also move to the right. By examining the position of stop 94 in FIG. 5, it is apparent that spring 78 has begun to compress since tube 80 now abuts the terminal housing at loading station 120, and further movement to the right is prevented. This structure, therefore, operates as a lost motion connection.

FIG. 6 shows the culmination of this cycle. Spring 78 has been completely compressed and terminal 25 has been inserted into cavity 20. Coil wire end 16 is now in slot 30 with an electrical contact properly established. Cutter blade 76 has moved through opening 98 which serves to keep cutter blade 76 flush with the outer surface of a terminal housing 18. Cutter blade 76 has severed excess wire as shown.

After completion of the insertion stroke as shown in FIG. 6, the insertion ram 74 returns to the position shown in FIG. 3. A pin 124 located on insertion track 80 engages an appropriate surface 122 on the ram 74 as the ram returns to its retracted position. In that way, the insertion track is also returned to its initial position.

The insertion track 80 does not act only as a guide tube for terminal 25. It also acts as a depth control device. A proper and reliable termination of wire 16 by terminal 25 involves more than merely shoving terminal 25 into cavity 20. Reliable electrical contact between terminal 25 and wire 16 is achieved by accurately positioning wire 16 at the proper depth in slot 31. In that way, the proper stress for sufficient electrical and mechanical contact is exerted on the wire.

A constant predetermined travel by ram 74 will not provide a constant insertion depth for terminal 25 in cavity 20. Due to manufacturing tolerances in the housing and in the laminations used to form the body of stator 12, for example, the lateral position of cavity 20 in FIGS. 3-6 will not always be the same. One solution to this problem would be to provide sufficient travel of the ram so that the front end of terminal 25 bottoms out against the closed end of cavity 20. This is an unacceptable solution because stresses would thereby be generated in the terminal itself which could change the spring characteristics of the terminal. Suitable contact pressure on wire 16 could not then be assured. Utilization of the insertion track 80 as a depth control device as well as a guide tube offers a solution to this problem. This solution results in ram 74 having a variable stroke.

FIG. 6 shows that the rightward movement of ram 76 stops when a second stop means, shoulder 84, abuts a first stop means, lefthand shoulder 82 on insertion track 80. The righthand end of track 80 has previously come to rest against the front end 34 of insulating housing 18. As a result, the incremental difference in length between ram 74 and track 80 will determine the position of terminal 25 relative to the front end 34 of housing 18. The front end 34 is, therefore, used as a datum or reference point for positioning terminal 25. This method also insures that any excess loads will be carried by the housing and will not act to deform the terminal. The insertion stroke is powered by an air cylinder which is not shown. By utilizing an air cylinder in which the piston will not bottom for any possible length of the insertion stroke, the cylinder can act as a spring and will not interfere with the depth control provided by this configuration. This same concept can be used wherever relative motion between a conductor and terminal is imparted to establish a connection and accuracy is desired.

FIGS. 7A, 7B, and 7C show the details of the termination of wire 16 by terminal 25 at loading station 120. FIG. 7A shows terminal 25 prior to its entry into cavity 20. Wire 16 is positioned in cavity slots 22a and 22b so that it spans cavity 20. It should be noted that slot 22b had greater depth than slot 22a. Wire 16, therefore, extends obliquely across cavity 20 from inner slot 22b to outer slot 22a. In FIG. 7A terminal 25 is positioned in insertion track 80. Ram 74 has not yet pushed terminal 25 into cavity 20.

FIG. 7B shows terminal 25 as it initially enters cavity 20. Careful examination shows that the leading edge 77 of cutter blade 76, which moves with ram 74, is positioned ahead of the front end of terminal 25. As a result, and in conjunction with the oblique position of wire 16 in the cavity, wire 16 will be trimmed before it is captured by the slots 30 in terminal 25. When the wire receiving entrance 31, which is not shown in this view, is taken into consideration, it is even more apparent that the wire 16 is severed before it is captured by terminal 25.

FIG. 7B also shows the action of block 97. As the cutter bar moves through opening 98, the upper surface cams cutter blade 76 upward so that it is flush with the outer surface of housing 18. Note that the cutter bar is not fully cammed until after the leading edge 77 passes the front 34 of housing 18, insuring that the cutter blade will not snag the housing.

FIG. 7C shows the completion of the termination. Wire 16 has been severed and has now been captured by the slots in terminal 25. Note that the free end 17 of wire 16 has been drawn into the housing by the continued movement of terminal 25. There is now no exposed conductor along the outer surface of housing 18.

The embodiment shown and described in this invention represents only one of numerous embodiments which lie within the scope of this invention. Differing embodiments will of necessity result where a terminal or housing differing from the examples dealt with herein, is used. Such differences will not result in a departure from the invention claimed, however. For example, placing the cavities in a rectangular array rather than the circular pattern shown here will result in changes to the mounting and indexing means, while still remaining within the scope of the claims. The tab 26 on terminal 25 could be replaced by an elongated post around which an external wire could be wrapped and then soldered. In that case, the relative lengths of ram 74 and insertion track 80 might not remain the same. The depth control means incorporated within track 80 and ram 74 would, however, be operative regardless of their relative lengths. This invention could also be used with multiple insertion means for simultaneously inserting a plurality of terminals into a plurality of terminal receiving cavities. This invention could be used wherever a terminal and wire are brought into contact by relative motion of the wire and terminal laterally with respect to the axis of the wire.

Changes in construction will occur to those skilled in the art and various apparently different modifications and embodiments may be made without departing from the scope of the invention. The matter set forth in the foregoing description and accompanying drawings is offered by way of illustration only.

I claim:

1. Apparatus for attaching a contact terminal to an electrical conductor and positioning said terminal and said conductor in an insulating housing, said terminal having conductor receiving means for establishing electrical contact with said conductor upon relative movement of said terminal towards the axis of said conductor, said conductor being initially spaced from said terminal and in alignment with said conductor receiving means, said apparatus comprising:
    mounting means for positioning said insulating housing,
    movable ram means movable towards and away from said mounting means,
    actuating means for moving said ram means towards said mounting means
    movable depth control means attached to said ram means by resilient lost motion connection means, said movable depth control means being movable towards said mounting means upon initial movement of said ram means towards said mounting means with said depth control means abutting a reference surface fixed with respect to said housing upon partial movement of said ram means toward said mounting means, further movement of said depth control means towards said mounting means being thereafter prevented,
    first stop means located on said movable depth control means,
    second stop means located on said movable ram means so that said second stop means abuts said first stop means when said ram means has moved a prescribed initial distance after movement of said movable depth control means has stopped, whereby
said ram means imparts relative lateral movement between said conductor and said terminal and said conductor is inserted at a precise point in said conductor receiving means in said terminal, said precise point being located a constant predetermined distance from said reference surface.

2. Apparatus as set forth in claim 1 wherein said movable depth control means and said movable ram means move along the same axis towards and away from said mounting means.

3. Apparatus as set forth in claim 2, wherein said movable ram means moves said terminal towards said conductor and said housing, said movable depth control means comprising a movable track, said ram being movable along said track to push said terminal along said track and into said housing.

4. Apparatus as set forth in claim 3 wherein a first end of said track abuts said reference surface and the second end of said track comprises said first stop means, said second stop means comprising a shoulder on said ram means which abuts said second end of said track when said terminal has been moved to a predetermined position with respect to said reference surface.

5. Apparatus as set forth in claim 4 wherein said reference surface comprises an external surface on said housing and wherein the length of said ram is greater than the length of said track by a specified distance, said specified distance being the desired depth of insertion of said terminal into said housing.

6. Apparatus as set forth in claim 3 wherein said track and said ram means both move along a horizontal axis.

7. Apparatus as set forth in claim 3 wherein a cutting blade is fixed to said ram means, said cutting blade moving with said movable ram to cut portions of said conductor which extend beyond said housing.

8. Apparatus as set forth in claim 3 wherein said cutting blade is positioned with respect to said ram so that said cutting blade cuts said conductor prior to the time when said terminal contacts said conductor.

9. Apparatus as set forth in claim 1 wherein said reference surface comprises a surface on said housing.

10. Apparatus as set forth in claim 1 wherein said resilient lost motion connection comprises a resilient spring connecting said depth control means to said ram means.

11. Apparatus as set forth in claim 1 wherein said housing has a plurality of terminal receiving cavities and said mounting means has indexing means for alternatively aligning each of said cavities with said ram means.

12. A terminal applicator apparatus for attaching a slotted plate terminal to an electrical wire, said wire extending across a cavity in an insulating housing and being fastened to opposite sidewalls of said cavity, said cavity being dimensioned to receive said terminal, said terminal applicator apparatus comprising:
    a loading station at which said terminal is inserted into said cavity,
    a housing mount for positioning said insulating housing with said cavity opening adjacent to said loading station,
    an insertion mechanism adjacent to said loading station, said insertion mechanism being aligned with said cavity and being on the opposite end of said loading station from said cavity, said insertion mechanism comprising an insertion track and an insertion ram movable therein towards and away from said loading station from a retracted position to a fully extended position,
    a terminal feed station, said terminal feed station being spaced from said loading station and being located between the retracted position and the extended position of said insertion ram, and
    a terminal feed track in alignment with said terminal feed station for delivering said terminal to said terminal feed station, said terminal feed track being perpendicular to said insertion mechanism, whereby
an electrical terminal can be attached to the end of an electrical wire by first capturing said wire so that it extends across a cavity and then forcing a slotted terminal into said cavity to make contact with said wire.

13. A terminal applicator apparatus for attaching contact terminals to electrical wires, said wires each being positioned at discrete points around the circumference of one end of a circular cylindrical member, said apparatus comprising:
    a loading station, an arbor for mounting said cylindrical member with said one end of said arbor being proximate to a first end of said arbor, transfer means for moving said arbor between a mounting position in which said first end is spaced from said loading station to a working position in which said first end is proximate to said loading station, positioning means located on a second end of said arbor, said second end being spaced from said loading station, said positioning means being rotating means for rotating said arbor about its axis and successively positioning each of said discrete points within said loading station, and insertion means aligned with said loading station and located on the opposite side of said loading station from said arbor, said insertion means having a ram movable towards and away from said loading station, so that one of said terminals located in said insertion means between said ram and said loading station is moved toward said loading station upon movement of said ram toward said loading station, whereby said terminal can be forced into contact with said electrical wire located at said discrete point within said loading zone and said positioning means can be used to locate another discrete point in said loading zone thereafter and a new termination can be accomplished with each stroke of said ram.

14. Apparatus as set forth in claim 13 wherein said transfer means comprises hinge means located proximate to said second end of said arbor so that said arbor may be rotated between an upright mounting position and a horizontal working position with one of said discrete points located within said loading zone by application of a force at said second end.

15. Apparatus as set forth in claim 14 wherein said insertion means is horizontal and said ram moves in a horizontal path.

16. A terminal applicator apparatus for attaching individual terminals with wire-receiving slots in their leading ends to the ends of the individual wires of a coil in the stator of an induction motor, each of said wires being positioned to span a separate cavity located in an insulating housing which is affixed to one end of said stator, each of said cavities being dimensioned to receive an individual terminal, said cavities being aligned with the axis of said stator, said terminal applicator apparatus comprising:

a loading station at which said terminal is inserted into said cavity, an arbor for positioning said stator, said arbor being located adjacent to said loading station, said arbor being hinged so that said arbor may be rotated between an upright mounting position and a working position in which said cavities are proximate to said loading station, said arbor being rotatable about its own axis so that each of said cavities may alternatively be positioned within said loading station, an insertion mechanism adjacent to said loading station, said insertion mechanism being aligned with said cavity within said loading station and being on the opposite end of said loading station from said arbor, said insertion mechanism comprising an insertion track and an insertion ram movable therein towards and away from said loading station from a retracted position to a fully extended position, a terminal feed station from said loading station and above said insertion track, said terminal feed station being located between the retracted and the extended position of said insertion ram, and a terminal punch aligned with said terminal feed station, said terminal punch being movable towards and away from said insertion track, said punch being cooperable with a stationary shoulder to sever said individual terminal from a carrier strip containing a plurality of terminals, whereby individual terminals can be first severed from said continuous carrier strip and individually pushed along said insertion track by said insertion ram so that said leading end of one of said terminals enters said one of said cavities and establishes electrical contact with said electrical wire laced thereacross, with said arbor operating to sequentially position each of said cavities proximate to said loading station.

17. Apparatus as set forth in claim 16 wherein said track comprises a tubular member.

18. Apparatus as set forth in claim 16 wherein said terminal feed station comprises an opening in the top of said tubular insertion track, said opening being dimensioned to receive a single terminal, said opening being positioned in alignment with said punch when said insertion ram is in said retracted position.

* * * * *

UNITED STATES PATENT OFFICE
CERTIFICATE OF CORRECTION

PATENT NO. : 3,984,908
DATED : October 12, 1976
INVENTOR(S) : George Nelson Ackley It is certified that error appears in the above-identified patent and that said Letters Patent are hereby corrected as shown below:

Column 10, Claim 16, line 23 after "station"

first occurrence insert - - - spaced - - -.

Signed and Sealed this

Fourteenth Day of December 1976

[SEAL]

Attest:

RUTH C. MASON
Attesting Officer

C. MARSHALL DANN
Commissioner of Patents and Trademarks